A. B. SHULTZ.
FASTENING DEVICE FOR PISTON PINS, &c.
APPLICATION FILED JAN. 11, 1911.

999,892.

Patented Aug. 8, 1911.

Witnesses,
Alfred Borkenhagen.
Emma M. Graham.

Inventor
Albert B. Shultz
by Geyer & Popp
Attorneys.

UNITED STATES PATENT OFFICE.

ALBERT B. SHULTZ, OF BUFFALO, NEW YORK.

FASTENING DEVICE FOR PISTON-PINS, &c.

999,892.　　　　　Specification of Letters Patent.　　Patented Aug. 8, 1911.

Application filed January 11, 1911. Serial No. 601,975.

*To all whom it may concern:*

Be it known that I, ALBERT B. SHULTZ, a citizen of the United States, residing at Buffalo, in the county of Erie and State of New York, have invented new and useful Improvements in Fastening Devices for Piston-Pins, &c., of which the following is a specification.

This invention relates to a fastening device which is more particularly designed for holding piston pins in place in the pistons of gas and other engines, so as to prevent the same from becoming loose, although this invention may also be used in other places where like conditions exist. These piston pins have heretofore been held in place by means of set screws working in threaded bosses of the pistons and engaging with the outer sides of the piston pins which were arranged in sockets formed in the bosses of the pistons. This construction is objectionable because it strains the piston and causes the same to become distorted or sprung out of shape, whereby the piston is caused to fit unevenly within the cylinder and results in leakage through the joint between the piston and cylinder and therefore impairs the efficiency of the engine due to loss of compression.

It is the object of this invention to provide a fastening device for this purpose which permits of securely fastening the piston pin in the piston so as to prevent displacement thereof without distorting or twisting the piston, thereby avoiding the objections above mentioned.

Figure 1:
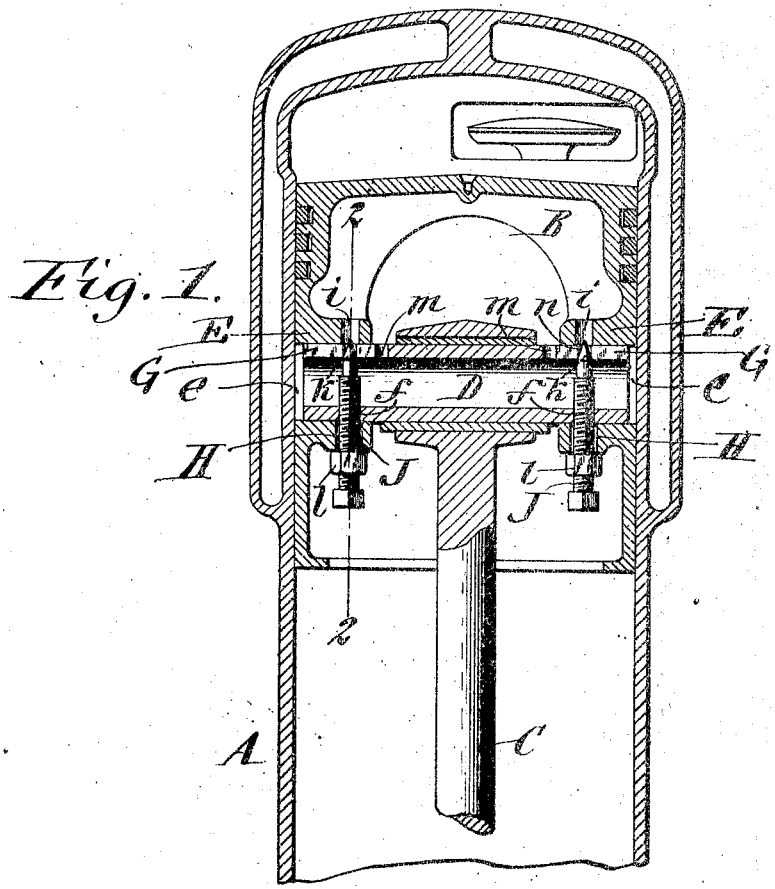
Figure 2:
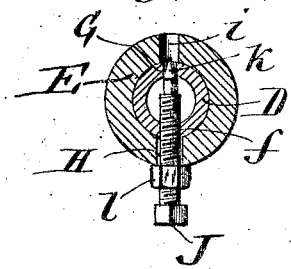
Figure 3:
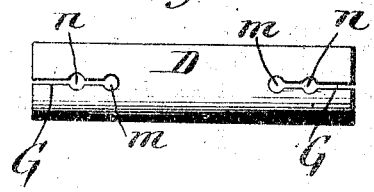

In the accompanying drawings: Figure 1 is a fragmentary longitudinal section of a gas engine showing the piston and piston pin connected by my improved fastening device. Fig. 2 is a fragmentary section taken in line 2—2, Fig. 1. Fig. 3 is a top plan view of the piston pin detached from the piston and piston rod.

Similar letters of reference indicate corresponding parts throughout the several views.

A represents the cylinder of a gas engine, B the piston reciprocating therein and C the piston rod which is pivotally connected with this piston. This pivotal connection consists of a hollow cylindrical piston pin D arranged transversely in the piston and having the piston rod or pitman pivotally mounted on the central part thereof. At its opposite ends this hollow piston pin is seated in cylindrical sockets $e$ formed in inwardly projecting bosses E arranged on diametrically opposite sides of the piston. My improved fastening device relates to the means whereby this piston pin is secured in the piston. In its preferred form this fastening device is constructed as follows: At each end the piston pin is provided on one side with a screw threaded opening $f$ and on its diametrically opposite side the same is provided with a longitudinal slot G extending to the respective end of the pin, so that in effect the pin is split. Each of the bosses is provided on one side in line with the threaded opening of the piston pin with a plain outer passageway or clearance opening H and on its diametrically opposite side in line with the slot in the adjacent part of the piston pin with an inner passageway or clearance opening $i$.

J represents two set screws each of which is provided with a threaded part which engages with the threaded opening $f$ in one end of the piston pin and is arranged in the adjacent outer passageway H of the respective boss and is also provided with a conical inner part or end $k$ which engages with opposite walls of the companion slot G of the piston pin and is also adapted to enter the inner passageway $i$ in the boss adjacent to the slot.

After the piston pin has been slipped through the bosses of the piston and the pitman or piston rod each of the set screws is first passed through an outer passageway H, then screwed through the threaded opening $f$ of the piston pin sufficiently to engage the conical inner end thereof with the walls of the slot and cause this part of the piston pin to spread and bind against the bore of the respective socket or seat in the boss. The capacity of the piston rod to thus spread is due to the longitudinal slot therein which in effect practically converts the same into a C-shaped spring. By thus binding the pin in the bosses of the piston by spreading the pin a firm and reliable fastening of the same in the piston is obtained without liability of distorting the latter and causing the same to bear unevenly at its periphery against the bore of the cylinder which otherwise would cause uneven wear and leakage in the joint between these parts and reduce the efficiency of the engine accordingly.

After the set screw has been tightened as much as is necessary to hold the piston pin in place within the piston the set screw is held against displacement by means of a jam nut *l* applied to the threaded part thereof and bearing against the outer side of the respective boss adjacent to the outer passageway thereof.

The inner passageway *i* is adapted to receive the conical inner end of the screw in case the latter is tightened to such an extent that it projects beyond the periphery of the piston pin.

In order to avoid the liability of cracking the piston pin upon spreading the slotted part thereof the inner end of this slot is provided with a circular enlargement *m*, as shown in Figs. 1 and 3. That part of the slot in the piston pin which is engaged by the conical part of the set screw is also enlarged so as to practically form a cylindrical seat *n* on the walls of this slot which provides a comparatively large bearing surface for the conical face or end of the set screw to engage with and thus avoid the production of a cutting edge.

I claim as my invention:

1. The combination of a body having a socket, a hollow pin arranged in said socket and provided on one side with a threaded opening and on its other side with a longitudinal slot, and a set screw having a threaded part engaging with said opening, and a conical part engaging with the walls of said slot.

2. The combination of a piston provided with a boss which contains a cylindrical socket and passageways on opposite sides of said socket, a hollow piston pin arranged in said socket and provided on one side with a threaded opening and on its other side with a longitudinal slot, and a set screw arranged in said passageway and having a threaded part engaging with said threaded opening and a conical part engaging with the walls of said slot.

3. The combination with a piston provided with a boss which contains a cylindrical socket and passageways on opposite sides of said socket, a hollow piston pin arranged in said socket and provided on one side with a threaded opening and on its other side with a longitudinal slot, a set screw arranged in said passageway and having a threaded part engaging with said threaded opening and a conical part engaging with the walls of said slot and a jam nut applied to said screw and bearing against the outer side of said boss.

4. The combination of a piston provided with a boss having a socket, and passageways on opposite sides of said socket, a hollow piston pin arranged in said socket and provided on one side with a threaded opening which registers with one of said passageways and a longitudinal slot on its opposite side which registers with the other passageway and a set screw having a threaded part engaging with the threaded opening of said pin and arranged in the adjacent guideway and a conical part engaging with the walls of said slot and adapted to enter the adjacent passageway.

5. The combination of a piston provided with a boss having a socket, and passageways on opposite sides of said socket, a hollow piston pin arranged in said socket and provided on one side with a threaded opening which registers with one of said passageways and a longitudinal slot on its opposite side which registers with the other passageway, and a set screw having a threaded part engaging with the threaded opening of said pin and arranged in the adjacent guideway and a conical part engaging with the walls of said slot and adapted to enter the adjacent passageway, that part of the slot which receives the conical part of the set screw being enlarged.

6. The combination of a piston provided with a boss having a socket, and passageways on opposite sides of said socket, a hollow piston pin arranged in said socket and provided on one side with a threaded opening which registers with one of said passageways and a longitudinal slot on its opposite side which registers with the other passageway, and a set screw having a threaded part engaging with the threaded opening of said pin and arranged in the adjacent guideway and a conical part engaging with the walls of said slot and adapted to enter the adjacent passageway, that part of the slot which receives the conical part of the set screw being enlarged and the inner end of said slot also being enlarged.

Witness my hand this 9th day of January, 1911.

ALBERT B. SHULTZ.

Witnesses:
 THEO. L. POPP,
 ANNA HEIGIS.